United States Patent [19]

Jinnai

[11] Patent Number: 5,444,345
[45] Date of Patent: Aug. 22, 1995

[54] SPEED CONTROL APPARATUS FOR A MOTOR

[75] Inventor: Shigeru Jinnai, Kawasaki, Japan

[73] Assignee: Canon Kabushiki Kaisha, Tokyo, Japan

[21] Appl. No.: 126,758

[22] Filed: Sep. 27, 1993

Related U.S. Application Data

[63] Continuation of Ser. No. 37,518, Mar. 22, 1993, abandoned, which is a continuation of Ser. No. 758,716, Sep. 9, 1991, abandoned, which is a continuation of Ser. No. 594,675, Oct. 10, 1990, abandoned, which is a continuation of Ser. No. 324,047, Mar. 16, 1989, abandoned.

[30] Foreign Application Priority Data

| Mar. 17, 1988 | [JP] | Japan | 63-62023 |
| Mar. 31, 1988 | [JP] | Japan | 63-76361 |
| Feb. 28, 1989 | [JP] | Japan | 1-47403 |
| Feb. 28, 1989 | [JP] | Japan | 1-47404 |

[51] Int. Cl.⁶ .................... H02P 5/00; G05B 11/28
[52] U.S. Cl. .................... 318/603; 318/599; 318/601; 318/608; 388/800
[58] Field of Search ............... 318/560–646, 318/245–293, 138; 388/800–890

[56] References Cited

U.S. PATENT DOCUMENTS

| 3,611,096 | 10/1971 | Sadashige . | |
| 3,869,019 | 3/1975 | Cardani . | |
| 3,940,675 | 2/1976 | Schroeder | 318/572 X |
| 4,034,277 | 7/1977 | Leenhouts | 318/565 X |
| 4,071,811 | 1/1978 | Irwin | 318/584 |
| 4,078,193 | 3/1978 | Anderson et al. | 388/810 |
| 4,138,632 | 2/1979 | Pauwels et al. | 318/599 X |
| 4,146,910 | 3/1979 | Oliver et al. | 318/603 |
| 4,223,258 | 9/1980 | Lacy | 318/599 |
| 4,295,082 | 10/1981 | Moto et al. | 318/599 |
| 4,423,498 | 12/1983 | Kimura et al. | 318/560 |
| 4,463,300 | 7/1984 | Mayne et al. | 318/687 |
| 4,578,625 | 3/1986 | Nazarian et al. | 318/603 |
| 4,578,749 | 3/1986 | Kuno et al. | 318/603 X |
| 4,584,507 | 4/1986 | Taylor | 388/810 |
| 4,593,366 | 6/1986 | Sugimoto et al. | 318/573 X |
| 4,600,866 | 7/1986 | Seto | 318/254 |
| 4,628,233 | 12/1986 | Bradus | 388/810 |
| 4,636,696 | 1/1987 | Minakuchi et al. | 388/810 |
| 4,651,020 | 3/1987 | Truman | 388/810 |
| 4,654,569 | 3/1987 | Mizumoto et al. | 318/571 X |
| 4,704,597 | 11/1987 | Sasao | 187/134 |
| 4,780,703 | 10/1988 | Ishida et al. | 341/6 |
| 4,782,275 | 11/1988 | Sakamoto et al. | 318/569 |
| 4,910,447 | 3/1990 | Masters | 318/599 |
| 4,980,617 | 12/1990 | Tajima et al. | 318/254 |
| 4,982,142 | 1/1991 | Shu | 318/268 |
| 4,988,945 | 1/1991 | Nagase | 324/175 |
| 5,023,924 | 6/1991 | Tajima et al. | 388/811 |
| 5,036,264 | 7/1991 | Ueki | 318/254 |
| 5,089,759 | 2/1992 | Miotke e tal. | 318/568.11 |

*Primary Examiner*—Paul Ip
*Attorney, Agent, or Firm*—Fitzpatrick, Cella, Harper & Scinto

[57] ABSTRACT

A speed control apparatus for a motor has a driver for the motor. The motor's rotational speed is detected, and a signal from the detector is counted. Signals from the counter received as the input by another circuit, which outputs data representing irregularities in the detection signal once the motor has reached its constant speed. Correction information is supplied to the motor driver on the basis of the irregularity data.

20 Claims, 7 Drawing Sheets

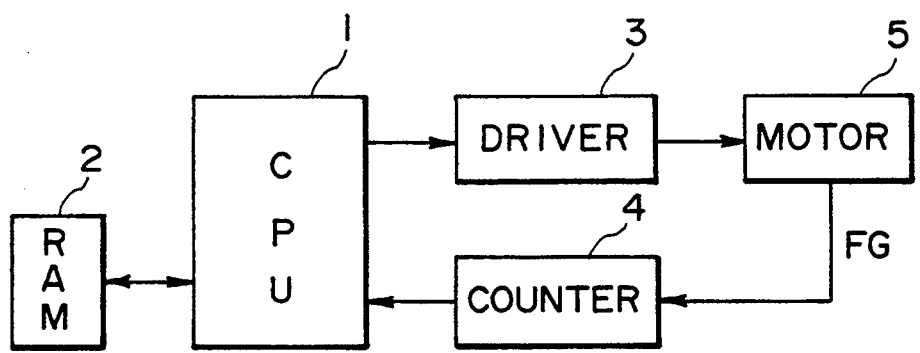
F I G. 1
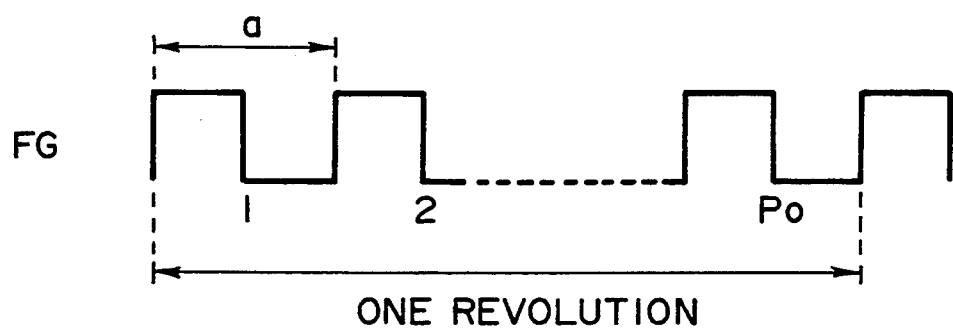
F I G. 2

SPEED CONTROL APPARATUS FOR A MOTOR

This application is a continuation of application Ser. No. 08/037,518 filed Mar. 22, 1993, now abandoned which is a continuation application of Ser. No. 07/758,716 filed Sep. 9, 1991, abandoned, which is a continuation of application Ser. No. 07/594,675 filed Oct. 10, 1990 abandoned, which is a continuation of application Ser. No. 07/324,047 filed Mar. 16, 1989 abandoned.

BACKGROUND OF THE INVENTION

1. Field of the Invention

This invention relates to a speed control apparatus for a motor used, for example, in a video tape recorder (VTR).

2. Related Background Art

Heretofore, the speed control of a motor has been effected under the premise that the accuracy of its FG (Frequency Generator) is very good.

SUMMARY OF THE INVENTION

The present invention provides a speed control apparatus which has means for detecting the number of revolutions of a motor and effects speed control on the basis of the output of said detecting means and which is designed such that the output of said detecting means is measured during constant speed revolution of the motor and data on the irregularity of the detected number of revolutions is prepared on the basis of said measured value to obtain correction information.

The present invention further provides a speed control apparatus which is designed such that when the measured value of the output of said detecting means reaches a predetermined value, said measured value is calculated to produce correction data and said data is stored in memory means and the driving speed of the motor is controlled on the basis of said stored information.

BRIEF DESCRIPTION OF THE DRAWINGS

FIGS. 1 to 3 show a first embodiment of the present invention, FIG. 1 being a block diagram of the first embodiment, FIG. 2 showing the waveform of an FG pulse, and FIG. 3 being an operation flow chart of the first embodiment.

DESCRIPTION OF THE PREFERRED EMBODIMENTS

Figure 3:
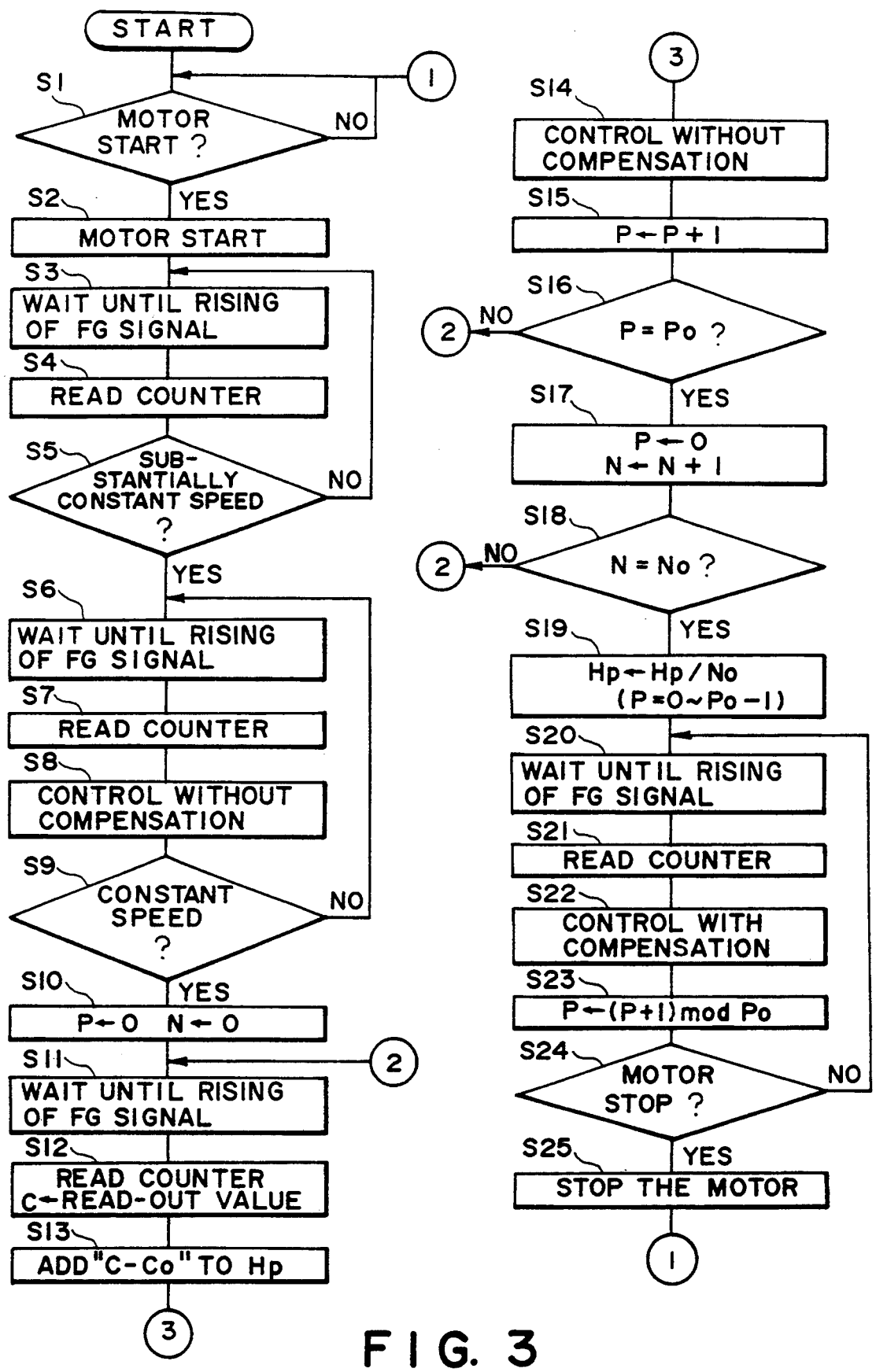

FIGS. 1 to 3 show a first embodiment of the present invention, FIG. 1 being a block diagram of the present embodiment, FIG. 2 showing the waveform of an FG pulse, and FIG. 3 being a flow chart of the present embodiment.

In FIG. 1, the reference numeral 2 designates a RAM for recording data for correction. The RAM 2 has registers such as P, N, C and Hp which will be described later. The reference numeral 3 denotes a driver for revolving a motor 5, the reference numeral 4 designates a counter for counting FG output (a indicated in FIG. 2), and the reference numeral 1 denotes a CPU for processing the inputs from the RAM 2 and the counter 4 and outputting a control value to the driver 3.

The counter 4 latches the count value at the rising, and the CPU 1 reads out the latched value. Also, as soon as the counter 4 latches, it is cleared to 0.

The operation of the present invention will now be described with reference to the flow chart of FIG. 3.

At step (hereinafter referred to as S) 1, a start command for the motor is waited for, and when the start command comes, the motor is started at S2. Then at S3, the program waits until the rising of FG, and at S4, the value of the counter 4 is input. Then at S5, whether a substantially steady speed (for example, 95% of the constant speed) has been reached is judged from the input value, and if the steady speed has not been reached, S3, S4 and S5 are repeated, until the constant speed is substantially reached. If the constant speed is substantially reached, advance is made to S6, where the program waits until the rising of FG, and at S7, the value of the counter 4 is input.

Then at S8, speed control without compensation is effected, and at S9, whether the steady speed has been reached is judged, and if the steady speed is not reached, S6, S7, S8 and S9 are repeated until the constant speed is reached.

If the constant speed is reached, advance is made to S10, where the registers P and N are set to 0. Then at S11, the program waits until the rising of FG, and at S12, the value of the counter is input, and that value is defined as C.

Then at S13, C−Co is added to the register Hp. (The register Hp is cleared to 0 at the start). Co is the value of the counter during rotation at constant speed when there is no jitter.

Then at S14, control without compensation is effected, and at S15, 1 is added to the register P. Then at S16, whether P has become equal to Po is judged, and if P is not equal to Po, S11–S16 are repeated, until P becomes equal to Po. Po is the number of FG signals in one revolution. If at S16, P is equal to Po, advance is made to S17, where P is set to 0 and 1 is added to N.

Then at S18, whether N has become equal to No is judged, and if N is not equal to No, S11–S18 are repeated, until N becomes equal to No. No is 1 or a greater integer.

If at S18, N is equal to No, advance is made to S19, where Hp (for P=0 to Po−1) is divided by No. At this time, raising to a unit or omission is effected so that the sum of Hp may become 0.

Then at S20, the program waits until the rising of FG, and at S21, the value of the counter is input. Then at S22, speed control with compensation is effected. An example of the calculation of the compensation will be shown below.

$$y = K_1(C + Hp - Co) + K_2 \Sigma (C + Hp - Co) + K_3$$

y: control value
C: the value of the counter
$K_1, K_2, K_3$ : constants

Calculation is effected by the use of the equation shown above, and Hp is added as a correction term. The control without compensation corresponds with the above equation without Hp (that is, with Hp=0).

Then at S23, P is defined as the residual of P+1 divided by Po. At S24, a check is made for a motor-stop command, and S20–S24 are repeated until a stop command for the motor comes. When the stop command comes, the motor is stopped at S25, and return is made to S1.

Figure 4:
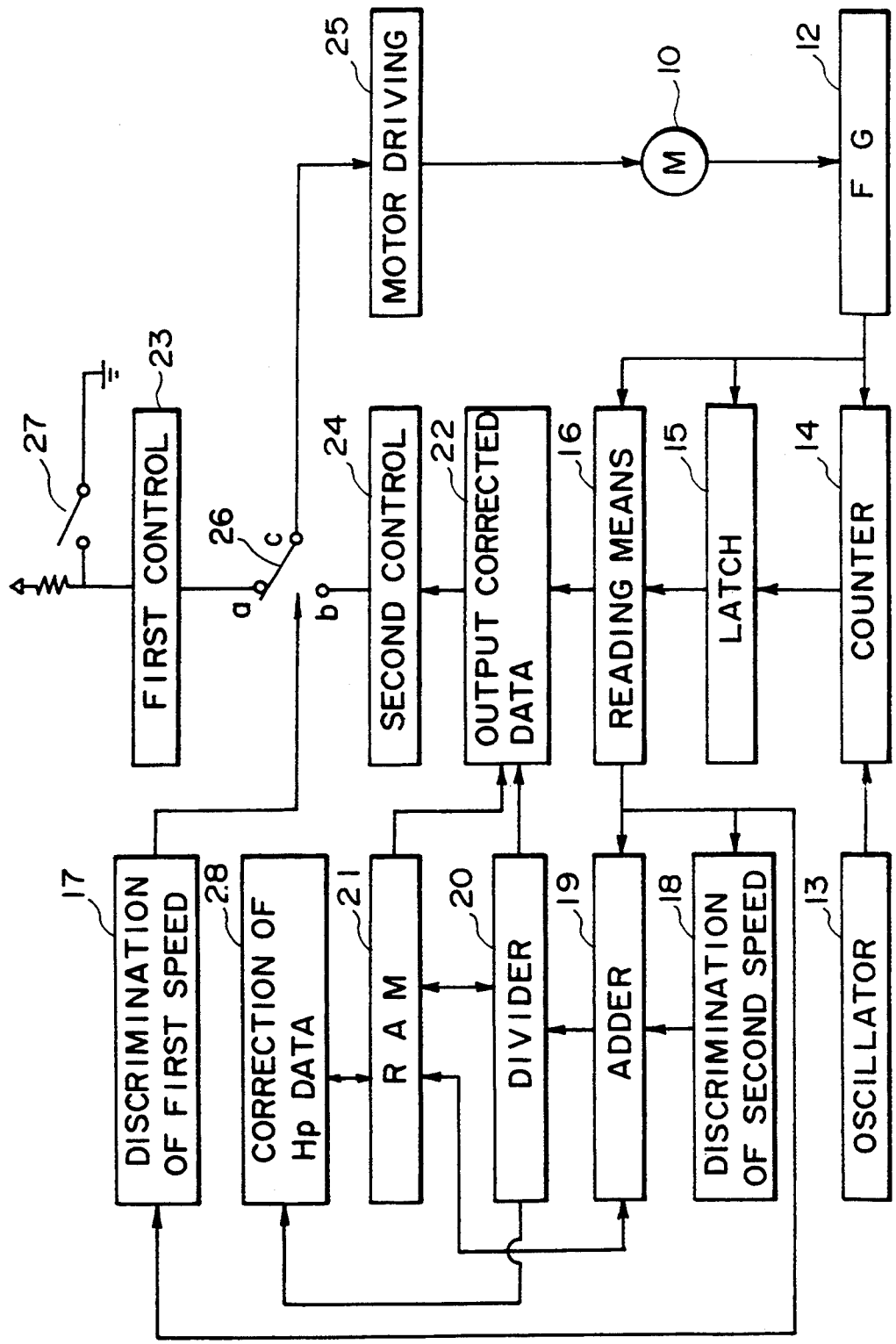
FIGS. 4 and 5 show a second embodiment of the present invention, FIG. 4 being a block diagram, and FIG. 5 being a flow chart.
Figure 5:
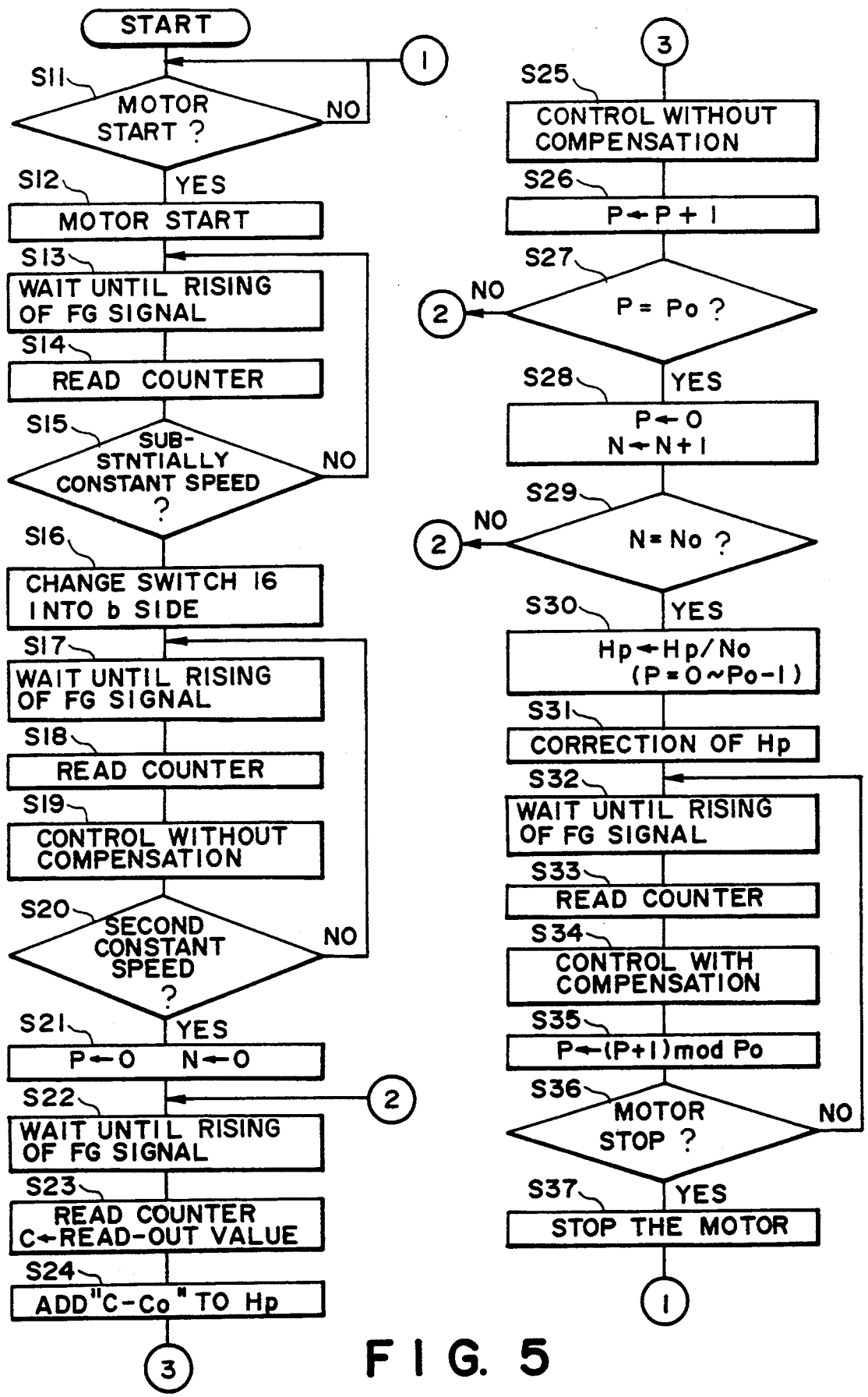

FIGS. 4 and 5 show a second embodiment of the present invention. In FIG. 4, the reference numeral 10 designates a motor, and the reference numeral 12 denotes a frequency generator (FG) comprising, for example, a rotary encoder provided on the motor 10. The frequency generator 12 generates the number Po FG pulses with duty 50% per one revolution of the motor 10, as shown in FIG. 2. A motor driving circuit 25 rotatively drives the motor 10 on the basis of a rotational speed control signal from first control means 23 or second control means 24 obtained through a switch 26. The first control means 23 transmits a speed control signal for revolving the motor 10 at a constant speed into the motor driving means 25 through a switch 26 upon closing of a start switch 27. The second control means 24 effects a calculation which will be described later, and transmits a speed control signal based on the result thereof into the motor driving means 25 through the switch 26.

The reference numeral 13 designates an oscillator whose oscillation frequency is sufficiently high, e.g. 4 MHz, as compared with the frequency of the FG 12.

The reference numeral 14 denotes a counter for counting the FG pulses from the FG 12 as shown in FIG. 2 (in that figure, the period for one FG pulse is indicated by a). The counter 14 performs its counting operation on the basis of a clock supplied from the oscillator 13.

The reference numeral 15 designates a latch which reads the count value of the counter 14 at the rising of the FG pulses and holds it. Accordingly, each count value in the latch 15 corresponds to the deviation of each corresponding FG pulse from the regular rotated position. As soon as the latch 15 reads the count value of the counter 14, the counter 14 is cleared to 0.

The reference numeral 16 denotes reading means for reading the value read by the latch 15. The reference numeral 17 designates first speed discriminating means, and the reference numeral 18 denotes second speed discriminating means. Both of these means output a discrimination signal on the basis of the count value from the reading means 16 when the speed of revolution of the motor 10 reaches a first speed, respectively and a second speed (for example, the first speed = the second speed × 0.95). Upon receiving of the discrimination signal from the first speed discriminating means 17, the switch 26 changes over from the a side to the b side.

The reference numeral 19 designates adder means, the reference numeral 20 denotes divider means, and the reference numeral 21 designates a RAM. The adder means 19 has therein registers P, C and N (the details of which will be described later), and starts addition by the input of the discrimination signal from the second speed discriminating means 18, and effects the addition of the count value from the reading means 16 a number of times (No×Po) corresponding to several revolutions after the motor 10 has assumed a constant speed, and also inputs the result of the addition and an addition completion signal to the RAM 21 and the divider means 20, respectively, at a point of time where the addition is completed. The divider means 20 reads out the result of the addition from the RAM 21 at a point of time where the addition completion signal is input, and divides it by the number of revolutions (No) to which the addition has been effected, and inputs the result thereof (the correction term data) to the RAM and also inputs a correction starting signal to corrected data output means 22. Accordingly, there are obtained Po correction term data, and each datum corresponds to the deviation of a corresponding FG pulse from its proper position.

The corrected data output means 22 corrects the count value read by the reading means 16 on the basis of the correction term data from the RAM 21, as will be described later.

The corrected data output means 22 does not introduce thereinto the correction term data from the RAM 21 until a division completion signal is input from the divider means 20.

The operation of the present embodiment will now be described with reference to the flow chart of FIG. 5.

First, at S11, the program waits until the switch 27 commanding the start of the motor is closed (at this time, the switch 26 is on the a side), and when the switch 27 is closed, at S12, a control signal is provided from the first control means 23 to the motor driving means 25 through the switch 26, and the motor is started by the motor driving means 25. Then at S13, the program waits until the FG pulse is output from the FG 12, and at S14, the count value from the latch 15 is input to the reading means 16. Then at S15, whether the speed of revolution of the motor 10 has reached the first speed (for example, the first speed is 95% of the second speed) is judged by the first speed discriminating means 17, and if the speed of revolution of the motor has not reach the first speed, S13, S14 and S15 are repeated, until the speed of revolution of the motor reaches the first speed. If at S15 the speed of revolution of the motor has reached the first speed, advance is made to S16, where the switch 26 is changed over from the a side to the b side by the discrimination signal from the first speed discriminating means 17, and advance is made to S17. At S17, the program waits until the rising of the FG pulse, and at S18, the count value from the latch 15 is input to the reading means 16.

Then at S19, speed control without compensation is effected. That is, as will be described later, the corrected data output means 22 does not introduce thereinto the correction term data from the RAM 21, but imparts to the second control means 24 the count value (C) from the reading means 16 minus the count value (Co) corresponding to the second speed, and the second control means 24 effects the speed control of the motor 10 on the basis of the value input from the corrected data output means 22.

Then at S20, whether the motor has reached the second speed is judged by the second speed discriminating means 18, and if the motor has not reached the second speed, S17, S18, S19 and S20 are repeated until the motor reaches the second speed.

When a discrimination signal is input from the second speed discriminating means 18 to the adder means 19, at S21, the registers P and N in the adder means 19 are set to 0. P is the register for indicating the relative position of the FG pulse, and N is the register for indicating the number of revolutions of the motor during the addition period. Then at S22, the program waits until the rising of the FG pulse, and at S23, the count value from the reading means 16 is input to the register C in the adder means 19.

Then at S24, C−Co is added to the register Hp in the RAM 21 by the adder means 19. The register Hp has Po areas ($H_0$ to $H_{po-1}$) and is cleared to 0 at the start.

Then at S25, the second control means 24 effects control without compensation, similar to S19, and at S26, the adder means 19 adds 1 to the register P. Then at S27, the adder means 19 judges whether the register P has become equal to Po, and if the register P is not equal to Po, S22–S27 are repeated, until the register P becomes equal to Po. Po is the number of FG pulses per one revolution of the motor 10. If at S27, the register P is equal to Po, advance is made to S28, where the adder means 19 sets the register P to 0 and adds 1 to the register N.

Then at S29, whether N has become equal to No is judged, and if N is not equal to No, S22–S29 are repeated until N becomes equal to No. No is 1 or a greater integer.

As the result of S22–S29, the following is stored to the register Hp:

$$H_0 = FG_0 + FG_{po} + \ldots + FG_{(No-1)Po}$$

$$H_1 = FG_1 + FG_{po+1} + \ldots + FG_{(No-1)Po+1}$$

$$H_{po-1} = FG_{po-1} + FG_{2po-1} + \ldots + FG_{NoPo-1}$$

As described above, the correction term data $H_0$, $H_1$, ..., $H_{po-1}$ are stored in the register Hp.

$FG_n$ (n=0 to $N_oP_o-1$) is the nth count value—Co (which corresponds to C−Co at S14) after the motor has reached the second speed.

If at S29, N=No, advance is made to S30, where the value of the register Hp (P=0−$P_{o-1}$) is divided by No by the divider means 20, and the result is defined as the value of the register Hp. Then at S31, the Po values $H_0$–$H_{po-1}$ constituting the register Hp in the RAM 21 are corrected by Hp data correcting means 28 so that $$\sum_{p=o}^{po-1} Hp = 0$$

is satisfied. Thus, as will be described later, even if control with compensation is effected by the Hp data, the motor 10 can be brought to the same position during each revolution.

Then at S32, the program waits until the rising of the FG pulse, and at S33, the count value C from the reading means 16 is input to the corrected data output means 22, and at S34, speed control with compensation is effected with respect to the motor 10. That is, the corrected data output means 22 calculates C−Co+Hp on the basis of the count value C from the reading means 16 and the correction term data Hp and Co in the RAM 21 after corrected, and inputs it to the second control means 24. The second control means 24 effects a calculation by the following equation:

$$y = K_1(C-Co+Hp) + K_2\Sigma(C-Co+Hp) + K_3$$

y: control value
C: the value of the counter
$K_1$, $K_2$, $K_3$: constants and imparts a control signal based on the obtained y to the motor driving means 25 through the switch 26, and controls the motor 10. The control without compensation corresponds with the above equation without Hp.

Then at S35, the register P is set the residual of P+1 divided by Po. At S36, S32–S36 are repeated until a motor stop command is input to the motor driving means 25, and when the stop command is input, at S37, the motor is stopped, and return is made to S11.

Figure 6:
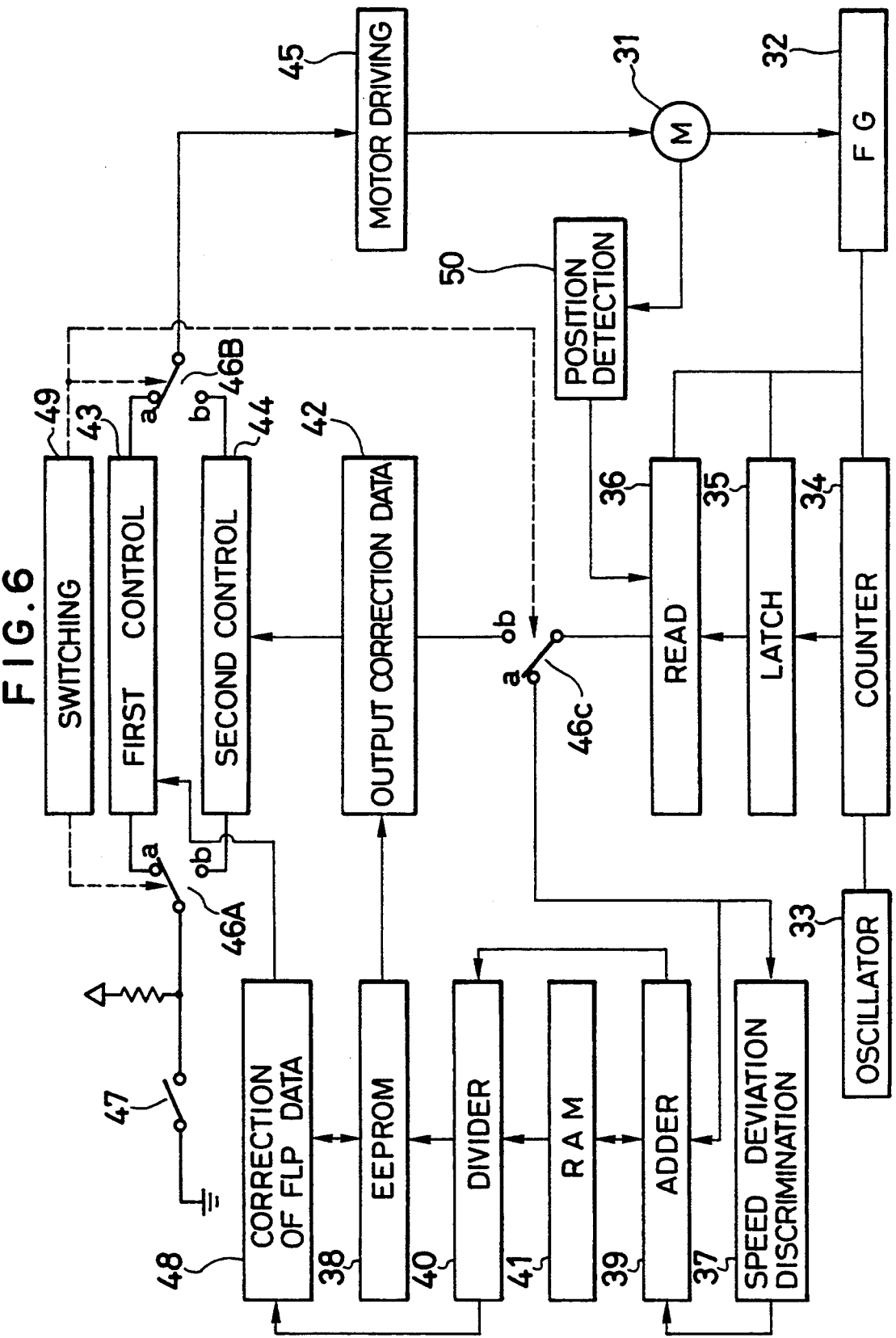
FIGS. 6 to 8 show a third embodiment of the present invention, FIG. 6 being a block diagram, and FIGS. 7 and 8 being flow charts.
Figure 7:
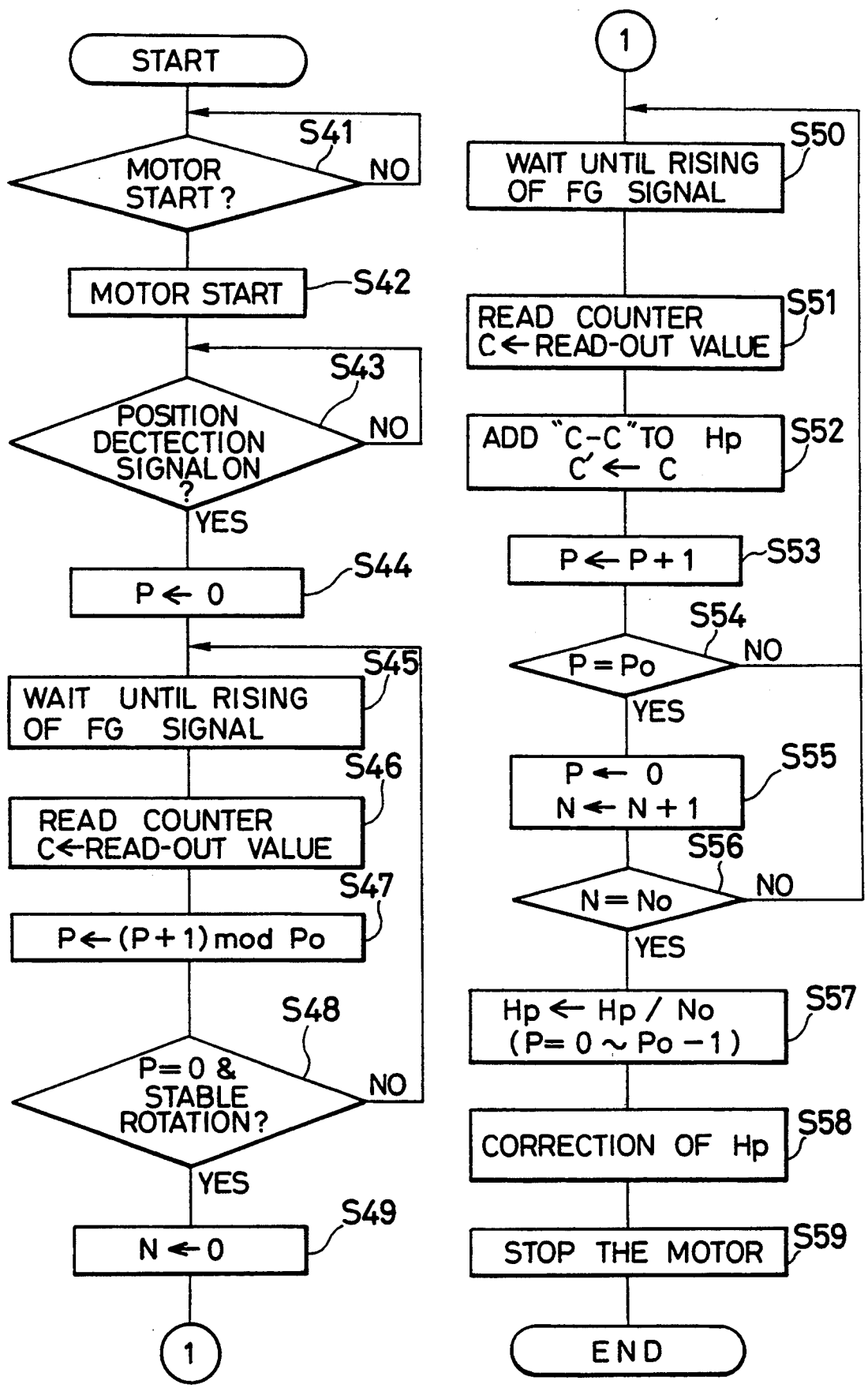
Figure 8:
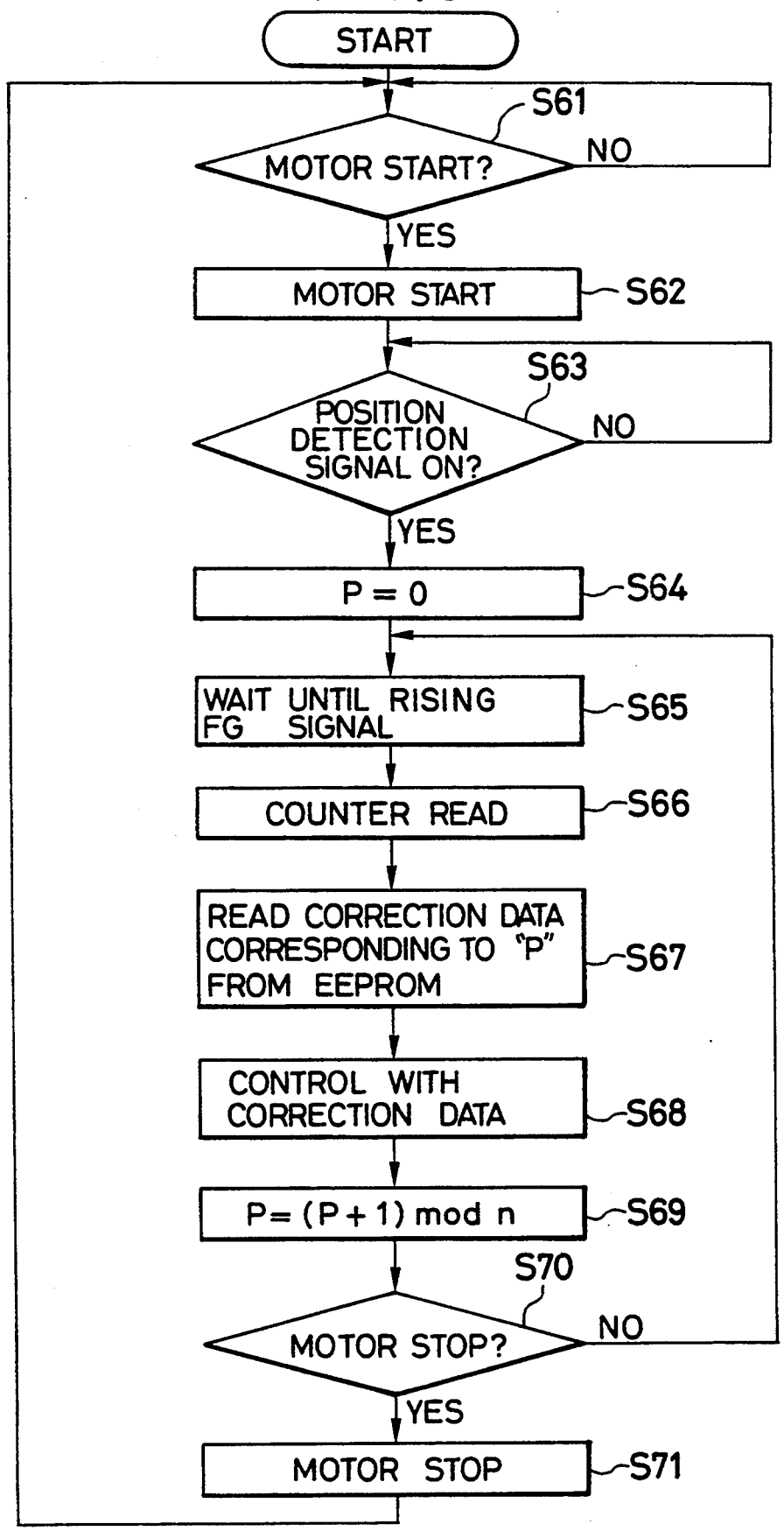

FIGS. 6 to 8 show a third embodiment of the present invention.

In FIG. 6, the reference numeral 31 designates a motor, and the reference numeral 32 denotes a frequency generator (FG) comprising, for example, a rotary encoder provided on the motor 31. The frequency generator 32 generates the number of Po FG pulses of duty 50 per one revolution of the motor 31 as shown in FIG. 2. The reference characters 46A, 46B and 46C designate switches adapted to be changed over in operative association with one another by switching means 49. The a side of each of these switches is used during the production of correction data, and the b side is used during the normal operation after the production of correction data.

A motor driving circuit 45 rotatively drives the motor 31 on the basis of a rotational speed control signal from first control means 43 or second control means 44 obtained through the switch 46B.

The first control means 43 inputs a speed control signal for revolving the motor 31 at a constant speed to the motor driving means 45 through the switch 46B, by the closing of a start switch 47. The second control means 44 effects a calculation which will be described later, after the closing of the start switch 47, and inputs a speed control signal based on the result thereof to the motor driving means 45 through the switch 46B.

The reference numeral 33 designates an oscillator whose oscillation frequency is sufficiently high, e.g. 4 MHz, as compared with the frequency of the FG 32.

The reference numeral 34 denotes a counter for counting the FG pulses from the FG 32 as shown in FIG. 2 (in that figure, the period of one FG pulse is indicated by a). The counter 34 performs its counting operation by a clock supplied from the oscillator 33. The reference numeral 50 designates position detecting means provided on the rotary shaft or the like of the motor 31 and outputting a pulse as a position detection signal per revolution of said motor.

The reference numeral 35 denotes a latch for reading the count value of the counter 34 at the rising of the FG pulse and holding it. As soon as the latch 35 reads the count value of the counter 34, the counter 34 is cleared to 0.

The reference numeral 36 designates reading means for reading the value read by the latch 35. The reference numeral 37 denotes speed fluctuation discriminating means which outputs a discrimination signal indicative of the fact that the revolution of the motor has become stable when the fluctuation of the count value from the reading means 36 has entered into a predetermined range.

The reference numeral 39 designates adder means, the reference numeral 40 denotes divider means, and the reference numeral 41 designates an RAM. The adder means 39 has therein registers P, C, C' and N (the details of which will be described later), and starts addition by the input of a discrimination signal from the speed fluctuation discriminating means 37, and effects the addition of the count value from the reading means 36 a number of times corresponding to several revolutions after the motor 31 has become stable and reached a constant speed, and also inputs the result of the addition and an addition completion signal to the RAM 41 and the divider means 40, respectively, at a point of time where the addition has been completed. The register P is a register for indicating the relative position of the FG pulse, the register N is a register for indicating the number of revolutions of the motor during the additional period, and the registers C and C' are registers for indicating the count value. The divider means 40 reads out the result of the addition from the RAM 41 at a point of time where the addition completion signal is input, and divides it by the number of revolutions (No) to which the addition has been effected, and inputs the result thereof (the correction term data) to EEPROM 38 and also inputs a correction starting signal to correction data output means 42. Accordingly, Po correction term data are obtained and each datum corresponds to the deviation of each corresponding FG pulse from its proper position.

The correction data output means 42 corrects the count value read by the reading means 46 from EEPROM 38, as will be described later, on the basis of the correction term data after corrected by Hp data correcting means 48 as will be described later.

The correction data output means 42 does not introduce thereinto the correction term data from EEPROM 38 until a division completion signal is input from the divider means 40.

The operation of the present embodiment during the production of the correction data will now be described with reference to the flow chart of FIG. 7.

First, at step (hereinafter referred to as S) 41, the program waits until the switch 47 for commanding the starting of the motor is closed (at this time, the switches 46A, 46B and 46C are on the a side), and when the switch 47 is closed, at S42, a control signal is provided from the first control means 43 to the motor driving means 45 through the switch 46B, and the motor is started by the motor driving means 45. Then, the adder means 49 waits until a position detection signal obtained through the reading means 46 and the switch 46C is ON, and when the position detection signal is ON, the adder means sets the register P to 0 at S44.

Then at S45, the program waits until the FG pulse is output from the FG 32, and at S46, the count value from the latch 45 is read by the reading means 46, and it is input to the register C' of the adder means 49. Then at S47, the register P is set to equal the residual of P+1 divided by Po, and at S48, whether the register P is 0 and moreover whether a discrimination signal has been input from the speed fluctuation discriminating means 47 to the adder means 49 is judged, and S45–S48 are repeated until both are accomplished, and when both are accomplished, advance is made to S49.

At S49, the register N of the adder means 49 is set to 0, and at S50, the program waits until the rising of the FG pulse, and at S51, the count value from the latch 45 is read by the reading means 48 and that count value is input to the register C.

Then at S52, C—C' is added to the register Hp in the RAM 41 by the adder means 49. The register Hp has Po areas ($H_0 - H_{po-1}$) and is cleared to 0 at the start.

Then at S53, the adder means 49 adds 1 to the register P. Then at S54, the adder means 49 judges whether the register P has become equal to Po, and if the register P is not equal to Po, S50–S54 are repeated, until the register P becomes equal to Po. Po is the number of FG pulses per revolution of the motor 31. When at S54, the register P is equal to Po, advance is made to S55, where the adder means 49 sets the register P to 0 and adds 1 to the register N.

Then at S56, whether N has become equal to No is judged, and if N is not equal to No, S50–S56 are repeated until N becomes equal to No. No is 1 or a greater integer.

As a result of S50–S56, the following is stored in the register Hp:

$$H_0 = FG_0 + FG_{po} + \ldots + FG_{(No-1)Po}$$

$$H_1 = FG_1 + FG_{po+1} \ldots + FG_{(No-1)Po + 1}$$

$$\vdots$$

$$H_{po-1} = FG_{po-1} + FG_{2po-1} + \ldots + FG_{NoPo-1}$$

As described above, the correction term data $H_0$, $H_1$, ..., $H_{po-1}$ are stored in the register Hp.

Here, $FG_n = C_n - C_{n-1}$ (n=0 to NoPo−1). $C_{-1}$ is the value of the counter immediately before addition is started, Co is the value of the counter when addition is started, $C_n$ is the value of the nth counter after addition is started, and $FG_n$ corresponds to C—C' of S12.

When at S56, N=No, advance is made to S57, where the value of the register Hp ($P=0-P_{o-1}$) is divided by No by the divider means 40, and the result thereof is input to the register Hp in EEPROM 38. Then at S58, Po values $H_0$ to $H_{po-1}$ constituting the register Hp in EEPROM 38 are corrected by the Hp data correcting means 48 so that $$\sum_{p=o}^{po-1} Hp = 0.$$

Thus, as will be described later, even if control corrected by Hp data is effected, the motor 31 can be brought to the same position during each one revolution. Then at S59, the first control means 43 stops the motor 31 by the correction completion signal from the Hp data correcting means 48.

The operation during the normal working after the production of the above-described correction data will now be described with reference to FIG. 8. First, the switches 46A, 46B and 46C are changed over to the b side by the switching means 49 and the program is started.

At S61, the program waits until the switch 47 for commanding the starting of the motor is closed (at this time, the switches 46A, 46B and 46C are on the b side), and when the switch 47 is closed, at S62, a control signal is provided from the second control means 43 to the motor driving means 45 through the switch 46B and the motor 31 is started.

Then at S63, the program waits until the position detection signal from the position detecting means 50 is ON, and then at S64, the register P is set to 0, and then at S65, the program waits until the rising of the FG pulse, and at S66, the count value from the reading means 46 is input to the correction data output means 42, and at S67, the correction term data Hp from EEPROM 38 is input to the correction data output means 42, and at S68, speed control with correction data is effected with respect to the motor 31. That is, the correction data output means 42 calculates C−Co+Hp on the basis of the count value from the reading means 46 and the correction term data Hp and Co in EEPROM 48 after correction (the theoretical value of the counter during the steady speed), and inputs it to the second control means 44. The second control means 44 effects a calculation by the following equation:

$$y = K_1(C - C_o + Hp) + K_2 \Sigma(C - C_o + Hp) + K_3$$

y: control value
C: the value of the counter
$K_1, K_2, K_3$: constants and imparts a control signal based on the obtained y to the motor driving means 45, and controls the motor 31. Then at S69, the register P is set to the residual of P+1 divided by Po. At S70, S65–S70 are repeated until a stop command for the motor is input to the motor driving means 45, and when the stop command is input, at S71, the motor is stopped, and return is made to S61.

According to the present invention, even a motor in which the accuracy of FG is not good can be speed-controlled highly accurately, and it becomes possible to reduce the jitter, for example, in VTR and adjustment or the like can be made easy.

I claim:

1. A speed control apparatus for a motor, comprising:
   driving means for driving the motor;
   detecting means for detecting the rotational speed of the motor and outputting detection pulse signals representing the rotational speed;
   counter means for counting a number of clock pulses in each interval of said detection pulse signals from said detecting means and outputting a signal representing counts by said counter means;
   data-producing means for producing error data of timings of said detection pulse signals by comparing the intervals of the detection pulses output from said detecting means with a reference value and producing correcting data for correcting the error of timings of said detection pulse signals after the motor reaches a constant speed, based on the signal from said counter means; and
   correcting means for supplying correction information to said driving means on the basis of the data from said data-producing means.

2. A speed control apparatus according to claim 1, wherein said data-producing means further comprises:
   means for discriminating whether the motor has reached a first constant speed, based on the detection pulse signals from said detecting means and periodically generating pulse signals representing the revolution of the motor;
   means for adding signals received from said counter means, in response to a signal from said discriminating means;
   means for memorizing the result of the addition performed by said adding means at a predetermined number of revolutions of said motor; and
   dividing means for outputting the value of the result of said addition divided by said predetermined number of revolutions.

3. A speed control apparatus for a motor, comprising:
   driving means for driving the motor;
   first control means for starting said driving means upon starting operation of the motor;
   means for detecting revolutions of the motor;
   first discriminating means for discriminating whether the motor has reached a first constant speed value;
   means for measuring a timing of pulse signals from said detecting means by comparison with a reference signal and outputting a signal representative of an error in the timing;
   second discriminating means for receiving the signal from said measuring means as an input and discriminating whether the motor has reached a second constant speed value;
   means for producing correction data based on the signal from said measuring means, in response to a signal from said second discriminating means; and
   second control means for outputting a control signal for controlling said driving means on the basis of the correction data from said correction data producing means.

4. A speed control apparatus for a motor, comprising:
   driving means for driving the motor;
   detecting means for detecting the rotational speed of the motor and outputting a detection signal representing the rotational speed;
   counter means for counting the detection signal from said detecting means and outputting a signal representing a count obtained by said counter means;
   data-producing means for producing data of the irregularity of the detection signal of said detecting means after said motor reaches a constant speed, based on the signal from said counter means; and
   correcting means for supplying correction information to said driving means on the basis of the data from said data-producing means,
   wherein said data-producing means further comprises:
   means for discriminating whether the motor has reached a first constant speed, based on the detection signal from said detecting means;
   means for adding signals received from said counter means, in response to a signal from said discriminating means;
   means for memorizing the result of the addition performed by said adding means at a predetermined number of revolutions of said motor; and
   dividing means for outputting the value of the result of said addition divided by said predetermined number of revolutions.

5. A speed control apparatus for a motor, comprising:
   driving means for driving the motor;
   first control means for starting said driving means upon starting operation of the motor;
   means for detecting revolutions of the motor;
   first discriminating means for discriminating whether the motor has reached a first constant speed value;
   means for measuring a timing of an output from said detecting means and outputting a signal representative of that timing;
   second discriminating means for receiving the signal from said measuring means as an input and discriminating whether the motor has reached a second constant speed value;
   means for producing correction data based on the signal from said measuring means, in response to the signal from said second discriminating means; and
   second control means for outputting a control signal for controlling said driving means on the basis of the correction data from said correction data producing means.

6. A speed control apparatus, comprising:
   (A) a motor;
   (B) a rotary member rotated by the motor;
   (C) pulse generating means mounted on the motor or the rotary member and for generating a plurality of pulses per one revolution of the mounting motor or rotary member;

(D) speed detecting means for detecting a speed of the rotary member or the motor by measuring an interval of the pulses;

(E) speed control means for controlling the motor so as to rotate at a predetermined constant speed on the basis of an output of the speed detection means;

(F) operating means for obtaining a plurality of error information of timing of the pulse signals output from said pulse generating means by measuring intervals of the pulse signals and comparing each of the intervals with a prestored reference value and storing the error information in a memory when said motor starts to rotate and reaches a predetermined speed; and (G) correcting means for correcting the speed control means by using the error information detected and stored by the operating means.

7. An apparatus according to claim 6, wherein the pulse generating means generates FG pulses;

the speed detecting means counts a predetermined clock at the interval of the FG pulses to thereby detect a deviation of the interval of the FG pulses from the design value, and;

the correcting means supplies the error information or correction value to the speed control means as a steady term.

8. An apparatus according to claim 7, wherein calculation and storage of the error information by the operation means is effected during several revolutions after the motor starts to rotate and then reaches the predetermined speed.

9. A speed control apparatus, comprising:
(A) a motor;
(B) a rotary member rotated by the motor;
(C) pulse generating means mounted on the motor or the rotary member and for generating a plurality of pulses per one revolution of the mounting motor or rotary member;
(D) memory means for storing a plurality of error information of timing of the pulse signals output from the pulse generating means, said error information being obtained by measuring intervals of the pulse signals and comparing each of the intervals with a reference value when said motor starts to rotate and reaches a predetermined speed;
(E) correcting means for correcting a generation timing as to the pulses generated by the pulse generating means by reading the error information stored in the memory means when the motor reaches the predetermined speed; and
(F) speed control means for outputting speed control information for controlling a rotational speed of the rotary member or the motor at the predetermined speed.

10. An apparatus according to claim 9, further comprising position detection pulse generating means for generating position detection pulses representing a rotation phase of the motor or the rotary member,
wherein the correcting means reads the error information from the memory means as a reference of the position detection pulse to correct the generation timing of each output pulse of the pulse generating means.

11. An apparatus according to claim 9, wherein the rotary member is a magnetic disc.

12. An apparatus according to claim 10, wherein the memory means is an $E^2$ PROM.

13. An apparatus according to claim 12, wherein the correcting means starts its operation in response to the rotary member reaching the predetermined speed.

14. An apparatus according to claim 9, wherein the correcting means includes a counter for counting a predetermined clock between the pulses generated by the pulse generating means.

15. A speed control apparatus, comprising:
(A) a motor;
(B) a rotary member rotated by the motor:
(C) pulse generating means mounted on the motor or the rotary member for generating a plurality of pulses per one revolution of the mounting motor or rotary member;
(D) pulse interval measuring means for measuring an interval of the pulses generated by the pulse generating means;
(E) detecting means for detecting a plurality of error information of generating timings of the pulses of the pulse generating means by comparing an output of the pulse interval measuring means with a reference value;
(F) memory means for storing the error information of each pulse interval detected by the detecting means as to all the pulses generated in one revolution of the motor;
(G) speed control means for outputting speed control information for controlling a rotational speed of the rotary member or the motor at the predetermined speed on the basis of an output of the pulse generating means; and
(H) correcting means for correcting the output of the speed control means by the error information stored in the memory means.

16. An apparatus according to claim 15, wherein the detecting means operates in response to the rotary member or the motor reaching the predetermined speed to store the detected error information in the memory means.

17. An apparatus according to claim 16, further comprising position detection pulse generating means for generating position detection pulses representing a rotation phase of the motor or the rotary member,
wherein the detecting means detects the position error information as to each pulse generated by the pulse generating means as a reference of the position detection pulse to store it in the memory means.

18. An apparatus according to claim 15, wherein the memory means is an $E^2$ PROM.

19. An apparatus according to claim 15, wherein the pulse interval measuring means includes a counter for counting a predetermined clock between the pulses generated by the pulse generating means.

20. An apparatus according to claim 16, wherein after the rotary member and the motor reaches the predetermined speed, the pulse interval measuring means, the detecting means and the memory means operate during several revolutions and the error information is stored in the memory means.

* * * * *

UNITED STATES PATENT AND TRADEMARK OFFICE
CERTIFICATE OF CORRECTION

PATENT NO.   : 5,444,345
DATED        : August 22, 1995
INVENTOR(S)  : SHIGERU JINNAI It is certified that error appears in the above-identified patent and that said Letters Patent is hereby corrected as shown below:

IN THE DRAWINGS

Sheet 4 of 7: "STNTIALLY" should read --STANTIALLY--.

COLUMN 5

Line 65, "set" should read --set to--.

COLUMN 8

Line 67, "48" should read --38--.

COLUMN 11

Line 25, "the design value, and;" should read --a desired value; and--.

COLUMN 12

Line 14, "motor:" should read --motor;--.

Signed and Sealed this

Twelfth Day of November, 1996

Attest:

BRUCE LEHMAN

*Attesting Officer*   *Commissioner of Patents and Trademarks*